(12) United States Patent
Urruti

(10) Patent No.: US 6,701,054 B1
(45) Date of Patent: Mar. 2, 2004

(54) THIN CARBON COATING OF OPTICAL WAVEGUIDES

(75) Inventor: Eric H. Urruti, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 10/009,518

(22) PCT Filed: Jun. 3, 1998

(86) PCT No.: PCT/US98/11345
§ 371 (c)(1),
(2), (4) Date: Jun. 29, 2001

(87) PCT Pub. No.: WO98/59268
PCT Pub. Date: Dec. 30, 1998

Related U.S. Application Data

(60) Provisional application No. 60/050,551, filed on Jun. 23, 1997.

(51) Int. Cl.[7] .................................................. G02B 6/02
(52) U.S. Cl. ........................................ 385/128; 385/123
(58) Field of Search .......................... 385/128, 123–127; 65/421, 423, 425

(56) References Cited

U.S. PATENT DOCUMENTS 5,062,687 A * 11/1991 Sapsford ...................... 385/128

FOREIGN PATENT DOCUMENTS

| EP | 0 400 938 | 12/1990 | ........... C03C/25/02 |
| EP | 0 402 895 | 12/1990 | ........... C03C/25/02 |

* cited by examiner

*Primary Examiner*—Phan T. H. Palmer
(74) *Attorney, Agent, or Firm*—William J. Chervenak; Kevin M. Able

(57) ABSTRACT

An optical waveguide fiber having a thin carbon coat over the clad glass layer is disclosed. The carbon coated waveguide shows superior dynamic fatigue resistance, improved adhesion of a polymer overcoat in environmental testing, excellent attenuation stability in environmental testing, and easy colorability.

7 Claims, 3 Drawing Sheets

THIN CARBON COATING OF OPTICAL WAVEGUIDES

This application is a 371 of PCT/U.S.98/11345 filed Jun. 3, 1998 which claims benefit of Provisional. No. 60/050,551 filed Jun. 23, 1997.

BACKGROUND OF THE INVENTION

The invention is directed to a thin carbon coating on an optical waveguide fiber. The coating acts to improve the waveguide fiber performance. More particularly, a thin carbon coating, formed on the clad glass layer of the waveguide fiber, has been found to improve dynamic fatigue performance of the waveguide fiber. In addition, the carbon coating markedly improves resistance to delamination between the polymeric coating and the waveguide fiber, under severe environmental conditions such as immersion in water.

The concept of coating optical waveguide fibers is known in the art. Polymer coatings have been developed to protect the waveguide fiber from handling damage as well as to reduce the impact of bending on waveguide attenuation. Also, hermetic coatings have been developed to seal the waveguide fiber from OH— ions, which enable growth of waveguide surface flaws when the waveguide is under stress. A hermetic coating also is important in protecting the waveguide from corrosive materials, and gasses, particularly hydrogen, which can diffuse into the waveguide and cause increases in attenuation.

Of the several types of coating material tested in the search for a hermetic coating, carbon has been found to be most compatible with the manufacture, packaging and use of a waveguide fiber.

The thickness of the carbon layer sufficient to provide hermeticity has been found to be in the range of 1000° A or greater. In U.S. Pat. No. 4,964,694, Oohashi et al., carbon coating thickness of the range of 1000 to 6000° A is taught (col. 3, II. 29–34). Thickness less than 1000° A tend to allow pinhole formation in the coating. Thickness greater than 6000° A tend to crack and peel from the waveguide surface. Hermeticity is also measured in terms of resistance to the passage of hydrogen through the coating. See, for example, U.S. Pat. No. 5,000,541, DeMarcello et al., col. 4, II. 19–39. At col. 5, II. 11–15, of '541 DeMarcello, a carbon layer of thickness of 1000° A is noted as providing a barrier to the diffusion of hydrogen.

The manufacturing and cost penalties which arise from the incorporation of a carbon coating step into the waveguide fiber manufacturing process are:

- drawing speed is limited by the requirements of carbon coating thickness and integrity;
- an additional on line measurement of carbon coating thickness must be added to the draw feedback control loop;
- additional quality control testing for hermeticity must be done; and,
- the black color of the waveguide complicates the process of coloring the polymer layer to color code multiple fiber assemblies.

SUMMARY OF THE INVENTION

The invention overcomes the drawbacks of achieving hermeticity while maintaining some of the benefits thereof. Additional unexpected benefits also derive from the presence of the thin carbon coating.

Thus, a first aspect of the invention is an optical waveguide fiber coated with a carbon layer having a thickness no greater than about 100° A. It is contemplated that thickness no greater than 50° A are sufficient. As carbon coating becomes thinner, one may expect the waveguide properties to approach those of a non-carbon coated waveguide fiber. Some benefit in terms of carbon coated waveguide fiber performance may be expected at thickness about 10 $\mu$m. The thin carbon layer is distinguished from a hermetic carbon coating by its permeability to fluids, such as hydrogen. However, the dynamic fatigue constant, which is about 20 for a silica clad waveguide, is greater than about 25 in the case of a waveguide having a thin carbon layer. This increase is quite significant in light of the fact that the fatigue constant appears as an exponent in the equation predictive of time to failure.

In addition to the characterization of the thin carbon layer by its thickness, the layer may also be characterized by its resistance per unit length, which is no greater than about 4 Mega-ohms/cm (M$\Omega$/cm). The thin layer of carbon is bonded to the waveguide clad glass layer. The layer is colored a light gray.

A second aspect of the invention is the surprising discovery that the thin carbon layer acts to essentially prevent delamination of the polymer coating. The integrity of the waveguide fiber having a protective polymer coating is such that substantially no attenuation increase was induced by immersing the carbon and polymer coated waveguide in water for extended time periods. The standard environmental tests call for room temperature water soak and hot water soak, about 65° C., for 30 days. The tests on the novel carbon coated waveguide fiber were extended to 128 days, in both room temperature and hot water, and still substantially no induced attenuation was observed.

An additional benefit of the coating results from its light gray color which allows, in contrast to the black hermetic coating, the waveguide fiber to be color coded using methods and pigments known in the art. The colors successfully applied and tested were yellow, white, red, and green. These colors are believed to be the most difficult to apply and the most likely to change in environmental testing.

DETAILED DESCRIPTION OF THE INVENTION

The optical waveguide fiber having the novel thin carbon coating is characterized by:

- a dynamic fatigue constant greater than about 25;
- superior polymer coating adhesion in severe environments; and,
- ease of coloring similar to that of a polymer coated waveguide having no carbon layer. Thus, a strength benefit of a carbon coated waveguide is realized, while essentially none of the drawbacks associated with a hermetic coating need be dealt with. In addition to the ease of coloring, it is believed the thin carbon coat may be applied at higher draw speeds than that of a hermetic coating process. No additional on line measurements coupled to the draw control loop are required and quality control can be maintained by making a statistically significant number of off line measurements of coating electrical resistance. These statements are based upon the results, discussed below, which show that resistance per unit length of the order of mega-ohms provide a suitable thin coating. In sharp contrast, the resistance requirement for a hermetic carbon coating, i.e., a coating having a thickness no less than about 500° A, is in the kilo-ohm range, three orders of magnitude lower.

Figure 1:
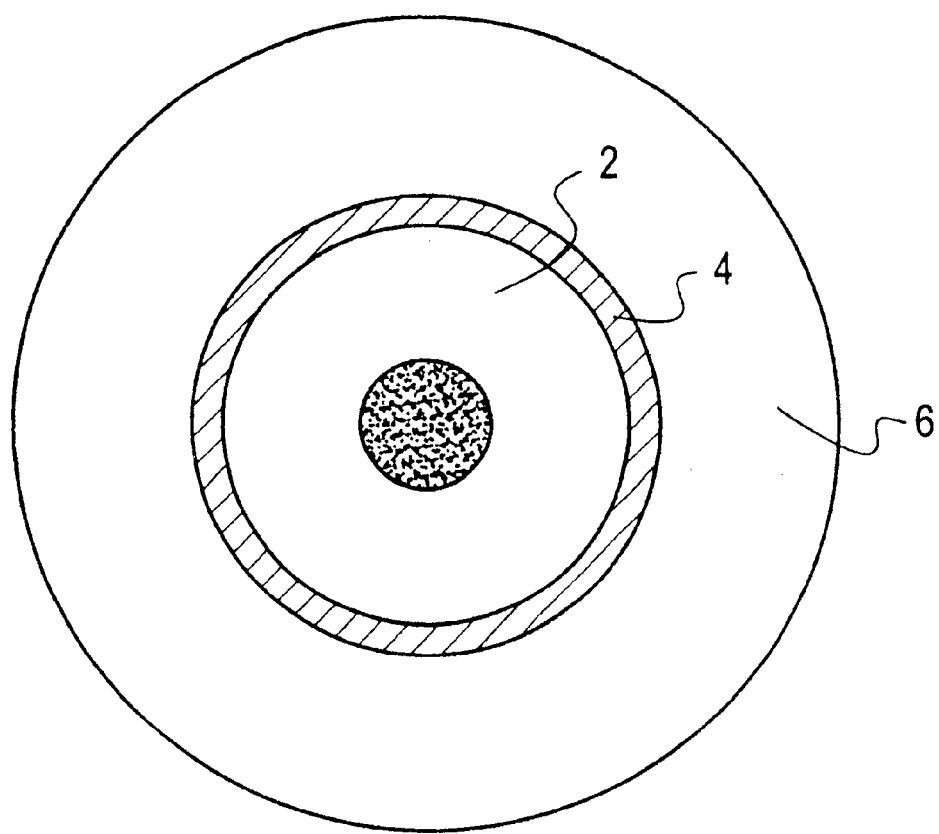
FIG. 1 is an end view of an optical waveguide fiber having a thin carbon coating and a polymer coating.

The end view illustration of the novel waveguide is shown in FIG. 1. The clad glass layer 2 is surrounded by and adhered to thin carbon layer 4. The outer layer 6 represents the protective polymer coating, which may comprise one or more layers. Note that the carbon layer is formed directly onto the glass surface of the waveguide fiber.

A method of forming the coating comprises pyrolytic deposition of carbon onto the waveguide fiber as the fiber emerges from the hot zone of the draw furnace. The fiber passes from the hot zone into a controlled environment chamber where a carbon containing compound reacts to produce a carbon layer on the waveguide surface. The reaction may be driven by the heat from the waveguide fiber. A process suitable for applying a hermetic coating or the thin carbon coating of this application is found in U.S. Pat. No. 5,346,520, Meabon, et al ('520 patent).

Because the concentration of the carbon containing compound in the reactor is low in the thin coating process, the pyrolytic reaction tended to be somewhat unstable. The pyrolytic reaction was stabilized by introducing a relatively inert gas into the flow. A gas such as argon was used. Depending upon the thickness of the carbon coated layer, the flow rate of the argon was in the range of 0 to 75% by volume of the total flow of gas into the reactor vessel.

EXAMPLE

Strength Testing of Carbon Coated Waveguides

A waveguide fibers was prepared having a thin carbon coating on the clad glass surface. A polymer coating was applied over the carbon coating. The waveguide was strength tested to determine a Weibull strength distribution and a dynamic fatigue constant.

Figure 2:
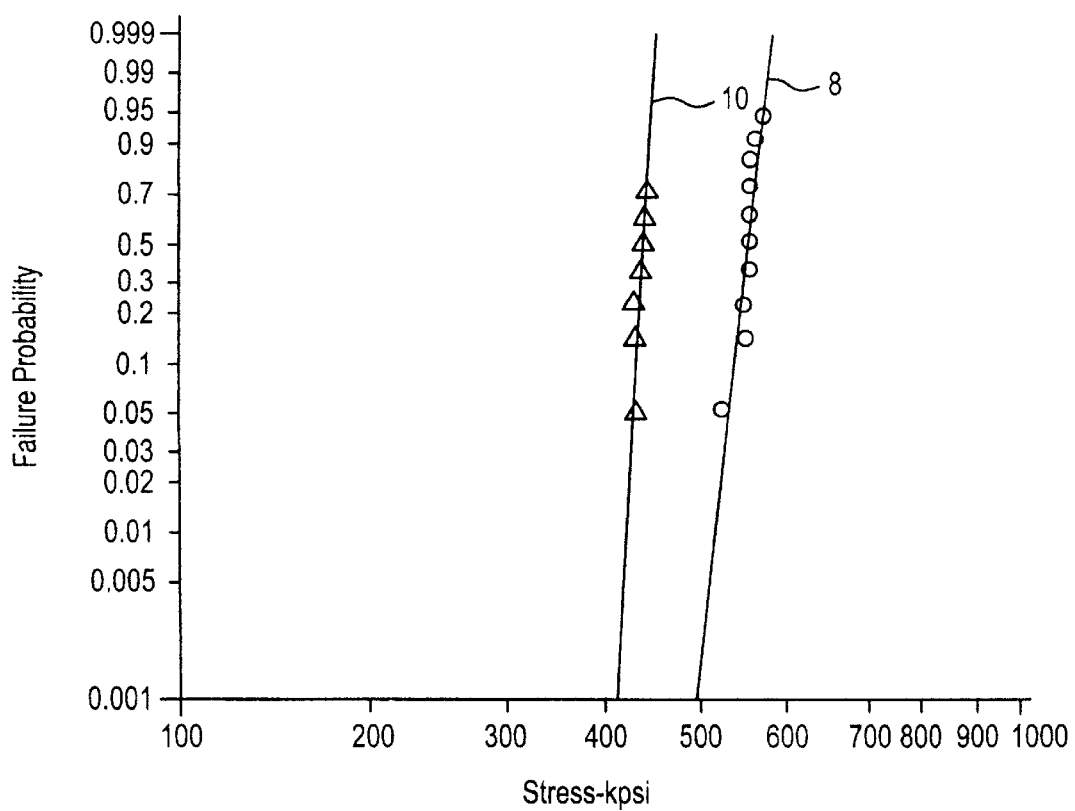
FIG. 2 is a Weibull strength chart showing failure probability vs. applied stress.

The Weibull plots shown in FIG. 2 show the failure probability of the fiber versus applied stress. The steep slope, straight line appearance of the plots is markedly similar to those characteristic of hermetic coated waveguides.

The data was generated by applying linear tension to break the fiber in 20 meter gauge lengths. The environment was controlled to a temperature of 30° C. and a relative humidity of 100%. Curve 10 is the failure probability vs. stress using a strain rate of 0.004%/min. Curve 8 represents a strain rate of 4.0%/min. The shift to the right of the higher strain rate curve is expected because the higher rate does not allow time for certain of the waveguide surface flaws to grow to failure. In effect, the higher strain rate acts upon a smaller distribution of flaws, i.e. faster growing flaws.

The dynamic fatigue constant was determined by fitting a line on a chart of break strength vs. stress rate, Multiple readings of strength at failure were taken at each of the two stress rates and $n_d$, the dynamic fatigue constant, was found by fitting a line to the data. The method is known in the art and detailed in Fiber Optic Test Procedure (FOTP) 76, published by a U.S. standards group.

TABLE 1

| Sample | Gauge (m) | Humidity | $n_d$ | Resistance |
| --- | --- | --- | --- | --- |
| A | 20 | 100% RH | 27.5 | 3.8 M☐/cm |
| A | 20 | 100% RH | 27.5 | 3.8 M☐/cm |
| A | 0.5 | 50% RH | 23.3 | 3.8 M☐/cm |
| A | 0.5 | 50% RH | 26.7 | 3.8 M☐/cm |
| A | 0.5 | 50% RH | 34.0 | 3.8 M☐/cm |

The 20 meter gauge test is more reliable than the 0.5 meter gauge test. It is not unusual for the shorter gauge test to yield a lower value of $n_d$. However, the data point which gives an $n_d$ of 23.3 may indicate that the carbon coating resistance of about 4 M/cm is near the limit of how thin the carbon coating may be. To test this hypothesis, the testing of three additional fibers was carried out at the shorter gauge length. The data is significant and does show the carbon coating is effective to increase $n_d$ to about 25 as compared to a waveguide having no carbon coating for which $n_d$ is typically about 20. By comparison, a thicker, hermetic carbon coating provides an n value of 200 or greater.

Comparative Example

Additional Strength Testing

A second waveguide fiber having a thin carbon layer on the clad glass surface was prepared. In this case the electrical resistance per unit length was 1.28 M/cm, about a factor of three lower than the previous example, indicative of a thicker carbon layer. The data is given in Table 2.

TABLE 2

| Sample | Gauge (m) | Humidity | $n_d$ | Resistance |
| --- | --- | --- | --- | --- |
| B | 0.5 | 50% RH | 26.7 | 1.28 M☐/cm |

The data again shows the effectiveness of the thin carbon layer in greatly improving the fatigue constant. The two data sets taken together suggest that a target thickness of about 4 M/cm may be appropriate.

Turning now to the effect of the carbon layer on polymer coating adhesion, it is noted that both of the waveguide fibers described in the examples performed well. Table 3 shows the test waveguides had essentially no degradation in coating adhesion or waveguide function under severe environmental testing.

TABLE 3

| Sample | Environ't | Time | Delamin'n | ☐A 1310 | ☐A 1550 |
| --- | --- | --- | --- | --- | --- |
| A | 23° C. Water | 17 days | no | | |
| A | 23° C. Water | 31 days | no | | |
| A | 23° C. Water | 128 days | no | 0.01 dB/km | 0.01 dB/km |
| A | 65° C. Water | 17 | no | | |
| A | 65° C. Water | 31 | no | | |
| A | 65° C. Water | 128 | no | 0.04 dB/km | 0.03 dB/km |
| B | 23° C. Water | 17 | no | | |
| B | 23° C. Water | 31 | no | | |
| B | 23° C. Water | 128 | no | 0.03 dB/km | 0.01 dB/km |
| B | 65° C. Water | 17 | no | | |
| B | 65° C. Water | 30 | no | | |
| B | 65° C. Water | 128 | no | 0.03 dB/km | 0.01 dB/km |

Figure 3:
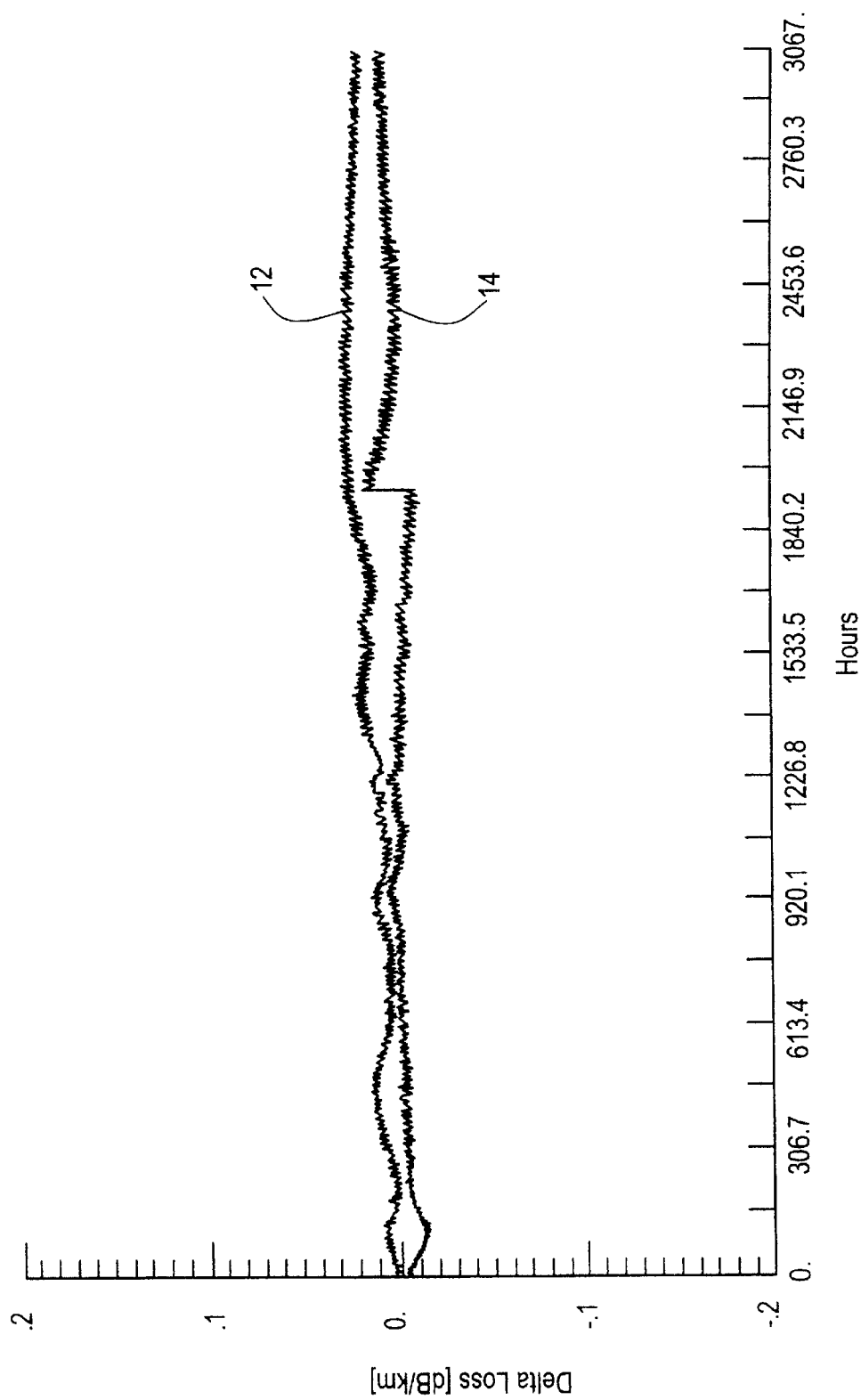
FIG. 3 is a chart of attenuation vs. time for a waveguide in an environmental test.

The absence of delamination of the coating from the carbon coated waveguide is unusual. More unusual is the very small change in attenuation of the waveguide in these severe environments. The results of the testing of the B samples are of particular import. The B samples had no adhesion promoter, so that the lack of delamination is quite unusual and unexpected. Such a coating applied to a silica surface would have delaminated very quickly, i.e., in no more than a few hours. Coating delamination causes strength degradation as well as increased attenuation. A typical environmental testing data set is shown charted in FIG. 3. The chart is a plot of attenuation vs. time for waveguide fiber A immersed in 65° C. water. Curve 12 shows the essentially continuous data readout of waveguide A attenuation at 1310 nm over the 128 day time period. Curve 14 is a plot of 1550 nm attenuation for waveguide A. The small attenuation increase is, for essentially all applications, not sufficient to degrade performance of a system comprised of this waveguide fiber.

The required thickness of the novel carbon coating may be determined by:

direct measurement made on a waveguide fiber end;

measurement of electrical resistance or another electrical property related to carbon thickness;

color of the carbon coated waveguide.

This last characteristic affords another benefit of the novel thin carbon coating. Hermetic coated fiber requires a thicker carbon layer and thus appears black. The polymer coating may be somewhat transparent so that a color added to the polymer coat may be changed in appearance by the underlying black layer. In point of fact, considerable difficulty has been encountered in manufacture of yellow, white, green, and red polymer coated hermetic fibers because of the black layer.

The light gray color of the carbon coated waveguide fiber disclosed herein does not interfere with the color added or applied to the polymer. Furthermore, the colors remain within specification, as determined by a standard Muncell color chart, when subjected to standard environmental testing.

Although particular embodiments of the invention have herein been disclosed and described, the invention is nonetheless limited only by the following claims.

I claim:

1. A coated optical waveguide fiber comprising;

an optical waveguide fiber having an outer surface, wherein said outer surface has a first coating comprising carbon, said first coating having a thickness no greater than about 100° A, and wherein the optical waveguide fiber has a dynamic fatigue constant $\geq 25$, and at least one polymer coating surrounding and in contact with said first coating.

2. The coated optical waveguide fiber of claim 1 wherein said carbon coating has an electrical resistance per centimeter of waveguide length no greater than about 4 MΩ/cm.

3. The coated optical waveguide fiber of claim 2 wherein the electrical resistance per cm of said carbon coating is no greater than about 2.5 MΩ/cm.

4. A coated optical waveguide fiber, comprising:

an optical waveguide fiber having an outer surface, wherein said outer surface has a first coating comprising a layer of carbon, having a thickness no greater than about 100° A, and at least one additional coating layer comprising a polymer, surrounding an in contact with said thin carbon layer, and, wherein said layer comprising carbon remains in contact with said surrounding polymer layer when immersed for at least 30 days in water, having a temperature in the range of bout 20 to 70° C.

5. The optical waveguide fiber of claim 4 further comprising coloring agents in said polymer coating.

6. The optical waveguide of claim 5 wherein the color agents produce waveguide fibers having one of the colors yellow, white, green, and red.

7. The coated optical waveguide fiber of claim 4 wherein the change in optical attenuation of the waveguide during and after water immersion is no greater than about 0.04 dB/km at 1310 nm and about 0.03 dB/km at 1550 nm.

* * * * *